(12) United States Patent
Richards (10) Patent No.: US 7,426,816 B1
(45) Date of Patent: Sep. 23, 2008

(54) ROPE HALTER APPARATUS AND METHOD OF USE

(76) Inventor: Doug Richards, 3629 W. Morrow Dr., Glendale, AZ (US) 85308

( * ) Notice: Subject to any disclaimer, the term of this patent is extended or adjusted under 35 U.S.C. 154(b) by 0 days.

(21) Appl. No.: 11/694,556

(22) Filed: Mar. 30, 2007

(51) Int. Cl.
*B68B 5/00* (2006.01)
*F16G 11/00* (2006.01)

(52) U.S. Cl. ......................................... 54/85; 24/115 H
(58) Field of Classification Search ............... 54/85, 54/24; 24/115 H, 129 R, 130, 199
See application file for complete search history.

(56) References Cited

U.S. PATENT DOCUMENTS

| | | | | |
|---|---|---|---|---|
| 366,972 A | * | 7/1887 | Michaelis | 54/24 |
| 367,831 A | * | 8/1887 | Moss | 54/24 |
| 370,346 A | * | 9/1887 | Lynch et al. | 54/24 |
| 434,182 A | * | 8/1890 | Gethmann et al. | 54/24 |
| 988,381 A | * | 4/1911 | Pellant | 119/66 |
| 1,480,006 A | * | 1/1924 | Ortman | 24/129 R |
| 5,205,687 A | * | 4/1993 | Boyland | 410/98 |

* cited by examiner

*Primary Examiner*—Son T. Nguyen
(74) *Attorney, Agent, or Firm*—Schmeiser, Olsen & Watts LLP (57) ABSTRACT

A rope halter apparatus, for use in conjunction with a rope, to form an adjustable halter, comprising: a body; a hook coupled to the body; a ring coupled to the body; and at least two bracket legs coupled to the body. A method of using the rope halter apparatus comprising: forming a first loop in a rope by placing a first end of the rope adjacent a first midpoint of the rope; placing the first end of the rope and the first midpoint of the rope between at least one set of bracket legs of a rope halter apparatus; placing a second end of the rope over an animal's neck; placing the first loop over the animal's nose; forming a second loop; placing the second loop through the ring and around the hook of the rope halter apparatus; and pulling the second end of the rope.

4 Claims, 10 Drawing Sheets

ROPE HALTER APPARATUS AND METHOD OF USE

BACKGROUND OF THE INVENTION

1. Technical Field

This invention relates to a rope halter apparatus for use in conjunction with a rope to form a halter for horses and the like, and the method of using the same.

2. Background Art

A halter is a device made of rope, leather straps, canvas, or other similar material that wraps around an animal's head and/or neck for controlling the animal's movements, leading the animal, or securing the animal. Rope halters are generally made from a rope tied in a series of knots, forming a particular design to apply pressure at certain points on the animal's head or neck. Rope halters are typically purchased already tied, and can only be used for a specific sized animal (i.e. the user would need to purchase different rope halters for different sized horses). A rope halter can typically only be adjusted slightly to compensate for different animal sizes.

Leather halters comprise leather straps combined to form a shape that allows the leather halter to wrap around the animal's head and/or neck to provide control over the animal. Similar to typical rope halters, leather halters can only be adjusted minimally to attempt to accommodate different sized animals.

Halters generally also comprise a lead rope so that the user can control the animal. The lead rope is connected to the rest of the halter in such a manner that when the lead rope is pulled in a certain direction, the halter will apply pressure to the head and/or neck of the animal to direct the animal's movements.

Accordingly, what is needed is a device which allows the user to quickly and easily create a rope halter without tying complicated and difficult knots, and which allows the user to create a halter of virtually any size.

DISCLOSURE OF THE INVENTION

The present invention may be readily adapted to a variety of ropes to create an adjustable halter. Embodiments of the present invention may provide, among other benefits, the ability of a user to quickly and easily create a rope halter. Furthermore, embodiments of the present invention may provide the advantage of allowing the user to customize the size of a rope halter to fit virtually any size animal.

Embodiments of the present invention generally include a rope halter apparatus, for use in conjunction with a rope, to form an adjustable halter, comprising: a body; a hook coupled to the body; a ring coupled to the body; and at least one bracket leg coupled to the body. A rope halter apparatus configured according to an alternate embodiment of the present invention may comprise: a body having a front end, a rear end, a top surface and a bottom surface; a hook coupled to the top surface at the front end of the body; a ring coupled to the top surface at the rear end of the body; at least two front bracket legs coupled to the bottom surface at the front end of the body; and at least two rear bracket legs coupled to the bottom surface at the rear end of the body.

A method of forming an adjustable halter using a rope and a rope halter apparatus configured according to an embodiment of the present invention comprises: forming a first loop in the rope by placing a first end of the rope adjacent a first midpoint of the rope, wherein an excess length of rope comprising a second end is not used to form the first loop; placing the first end of the rope and the first midpoint of the rope between at least one set of bracket legs of the rope halter apparatus; placing the second end of the rope over an animal's neck; placing the first loop over the animal's nose so the first loop circumscribes the animal's nose; forming a second loop by placing two midpoints of the excess length of rope together; placing the second loop through a ring of the rope halter apparatus; placing the second loop around a hook of the rope halter apparatus; and pulling the second end of the rope.

The foregoing and other features and advantages of the invention will be apparent to those of ordinary skill in the art from the following more particular description of the invention and the accompanying drawings.

BRIEF DESCRIPTION OF THE ILLUSTRATIONS

The invention will hereinafter be described in conjunction with the appended drawings where like designations denote like elements, and.

DESCRIPTION OF THE INVENTION

As discussed above, embodiments of the present invention relate to a rope halter apparatus. Generally, a rope halter apparatus comprises an apparatus to be used in conjunction with a rope to form a halter that can be used on an animal.

As illustrated in FIGS. 1-5, a rope halter apparatus 10 configured according to a first embodiment of the present invention comprises a body 14. The body 14 has a front end 42, a rear end 38, a top surface 50 and a bottom surface 54. The body 14 may be formed in the general shape of a rectangle where the top surface 50 and the bottom surface 54 are rectangular with two long edges 46 and two short edges 58. The two short edges 58 form the front end 42 and rear end 38 of the body 14. The two long edges 46 of the body 14 each have a semicircular opening 18.

In alternate embodiments of the present invention, the body 14 may be formed in any shape desired. For example, the body 14 may be formed in an oval that narrows towards the center in a similar location to that of the semicircular openings 18 in the previous embodiment. The body 14 may also simply be formed with non-straight lines in a shape similar to that discussed in the first embodiment of the present invention so that the body is generally hourglass shaped.

A ring 26 is coupled to the body 14 at the rear end 38 of the body 14 on the top surface 50. The ring 26 is circular or oval in shape with an opening running completely through. The opening in the ring 26 faces the two short edges 58 of the body 14. The ring 26 is secured in a perpendicular position to the top surface 50 of the body 14. The ring 26 is coupled to the body 14 in such a way that, during use, the ring 26 will not move with respect to the body 14. The ring 26 may be coupled to the body 14 by welding, adhesive, or with a screw, pin or the like. The ring 26 may also be integrally formed with the body 14 in a single piece.

In alternate embodiments of the present invention, the ring 26 may be formed in any shape desired. The ring 26 may be square or rectangular or the like. The shape of the ring 26 may be influenced by the cost of manufacturing and the type of material chosen for the ring 26.

In alternate embodiments of the present invention, the ring 26 may be movably or rotatably coupled to the body so that the rope halter apparatus 10 may collapse into a more compact configuration when not in use.

A hook 22 is coupled to the body 14 at the front end 42 of the body 14 on the top surface 50. The hook 22 has a curved shape which allows it to secure a loop of rope when the rope halter apparatus 10 is used in conjunction with a rope to form a halter. The hook 22 is positioned so that its concave face 24 is pointed away from the ring 26. The hook 22 is securely fastened to the body 14 so that, during use, it does not move with respect to the body 14. The hook 22 may be coupled to the body 14 by welding, adhesive, or with a screw, pin or the like. The hook 22 may also be integrally formed with the body 14 in a single piece.

Figure 10:
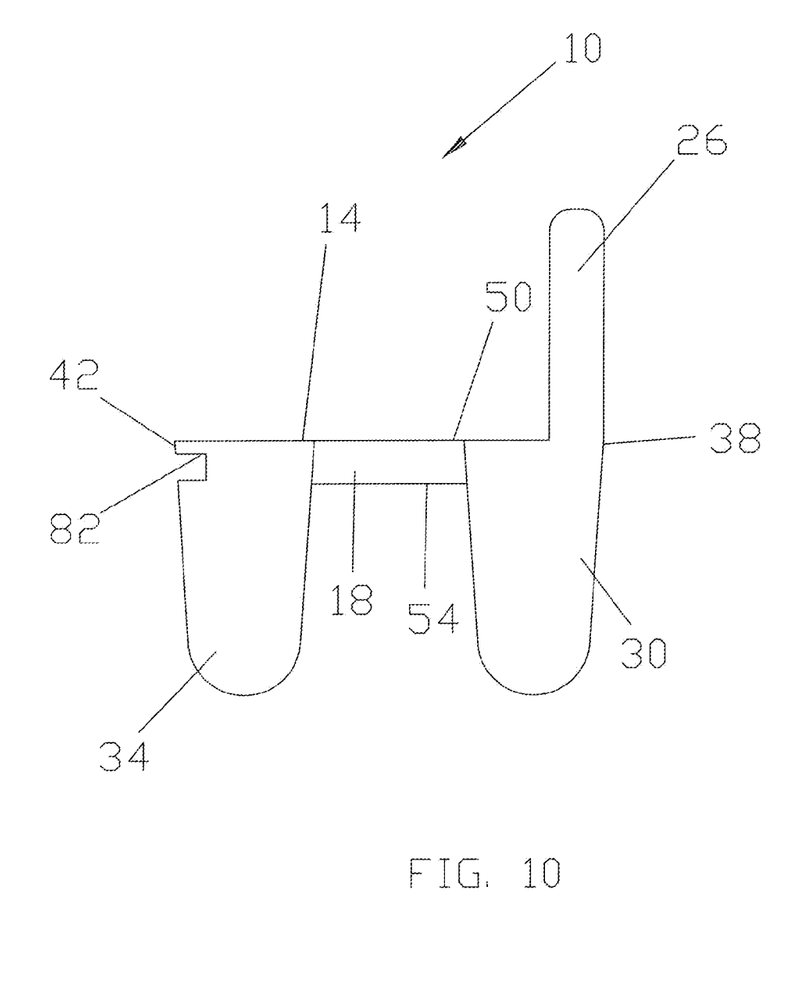
FIG. 10 is a side view of a rope halter apparatus configured according to a third embodiment of the present invention.

In alternate embodiments of the present invention, the hook 22 may be replaced by any device that will secure a loop of rope and prevent the loop of rope from completely closing. Examples of alternatives to hook 22 may include a groove 82 (see FIG. 10) into which a portion of a loop of rope is held and the like. The hook 22 may also be formed in any shaped desired. For instance, the hook 22 may be formed in the shape of a channel or the like. The shape of the hook 22 may be influenced by the cost of manufacturing and the type of material chosen for the hook 22.

In alternate embodiments of the present invention, the hook 22 may be movably or rotatably coupled to the body so that the rope halter apparatus 10 may collapse into a more compact configuration when not in use.

At least one set of bracket legs may be coupled to the body 14. In the first embodiment of the present invention, at least two front bracket legs 34 are coupled to the bottom surface 54 at the front end 42 of the body 14. The at least two front bracket legs 34 may be coupled directly to the bottom surface 54 or they may be coupled to the two long edges 46 of the body 14 and extend downwards from the bottom surface 54 of the body 14. The at least two front bracket legs 34 may be coupled to the body 14 by welding, adhesive, or with a screw, pin or the like. The at least two front bracket legs 34 may also be integrally formed with the body 14 in a single piece.

In the first embodiment of the present invention, the at least two front bracket legs 34 are in the shape of rectangles with one end coupled to the body 14 and the other end extending downward in the opposite direction from the hook 22. The end of the at least two front bracket legs 34 which is farthest from the body 14 may have rounded corners in order to prevent injury to the user or snagging of the rope.

The distance between the at least two front bracket legs 34 is sufficient to hold at least two pieces of standard size rope together side-by-side while allowing the at least two pieces of rope to slide with respect to each other. In alternate embodiments of the present invention, the at least two front bracket legs 34 may be crimped in order to secure the at least two pieces of rope in place (see FIG. 9). In this alternate embodiment, the at least two pieces of rope will not be allowed to slide with respect to each other.

In additional alternate embodiments of the present invention, the at least two front bracket legs 34 may be any shape desired and may be coupled to the body 14 in any position which allows the at least two front bracket legs 34 to hold at least two pieces of rope together.

A second set of bracket legs, at least two rear bracket legs 30, may be coupled to the bottom surface 54 of the body 14 at the rear end 38 of the body 14. The at least two rear bracket legs 30 may be coupled directly to the bottom surface 54 or they may be coupled to the two long edges 46 of the body 14 and extend downwards from the bottom surface 54 of the body 14. The at least two rear bracket legs 30 may be coupled to the body 14 by welding, adhesive, or with a screw, pin or the like. The at least two rear bracket legs 30 may also be integrally formed with the body 14 in a single piece.

In the first embodiment of the present invention, the at least two rear bracket legs 30 are in the shape of rectangles with one end coupled to the body 14 and the other end extending downward in the opposite direction from the ring 26. The end of the at least two rear bracket legs 30 which is farthest from the body 14 may have rounded corners in order to prevent injury to the user or snagging of the rope.

The distance between the at least two rear bracket legs 30 is sufficient to hold at least two pieces of standard size rope together side-by-side while allowing the at least two pieces of rope to slide with respect to each other. In alternate embodiments of the present invention, the at least two rear bracket legs 30 may be crimped in order to secure the at least two pieces of rope in place (see FIG. 9). In this alternate embodiment, the at least two pieces of rope will not be allowed to slide with respect to each other.

In additional alternate embodiments of the present invention, the at least two rear bracket legs 30 may be any shape desired and may be coupled to the body 14 in any position which allows the at least two rear bracket legs 30 to hold at least two pieces of rope together.

In other embodiments of the present invention, the at least two front bracket legs 34 and the at least two rear bracket legs 30 may be combined into a single set of bracket legs which would serve the same purpose as the front and rear sets of bracket legs.

Additional embodiments of the present invention comprise the at least two front bracket legs 34 and/or the at least two rear bracket legs 30 having adjustable positioning in order to allow the rope halter apparatus 10 to use different sizes of rope. The adjustable at least two front bracket legs 34 and at least two rear bracket legs 30 may also allow the rope halter apparatus 10 to compress into a more compact configuration for storage.

In still other embodiments, the rope halter apparatus 10 includes at least one bracket leg. The at least one bracket leg is any device which holds at least two sections of rope together. A single bracket leg may also be used. Configurations of the present invention utilizing a single bracket leg may include a single bracket leg formed in the shape of a channel in order to hold at least two pieces of rope.

FIGS. 6-8F illustrate a method of using a rope halter apparatus 10 configured according to an embodiment of the present invention and a rope 64 to form an adjustable halter. In order to form an adjustable halter, a first loop 72 is formed in the rope 64. The first loop 72 is formed by placing a first midpoint 68 of the rope 64 adjacent a first end 80 of the rope 64. An excess length 76 of rope 64 comprising a second end 96 is not used in forming the first loop 72.

As seen in FIGS. 6-8A, the first midpoint 68 and the first end 80 of the rope 64 are now placed between the at least two front bracket legs 34 and the at least two rear bracket legs 30. The at least two front bracket legs 34 and the at least two rear bracket legs 30 hold the first midpoint 68 and the first end 80 of the rope 64 together while still allowing them to be moved parallel to one another in order to allow the size of the first loop 72 to be adjusted. The distance between the at least two front bracket legs 34 and between the at least two rear bracket legs 30 is such that the first midpoint 68 and the first end 80 of the rope 64 are held in place side-by-side by frictional engagement.

Figure 1:
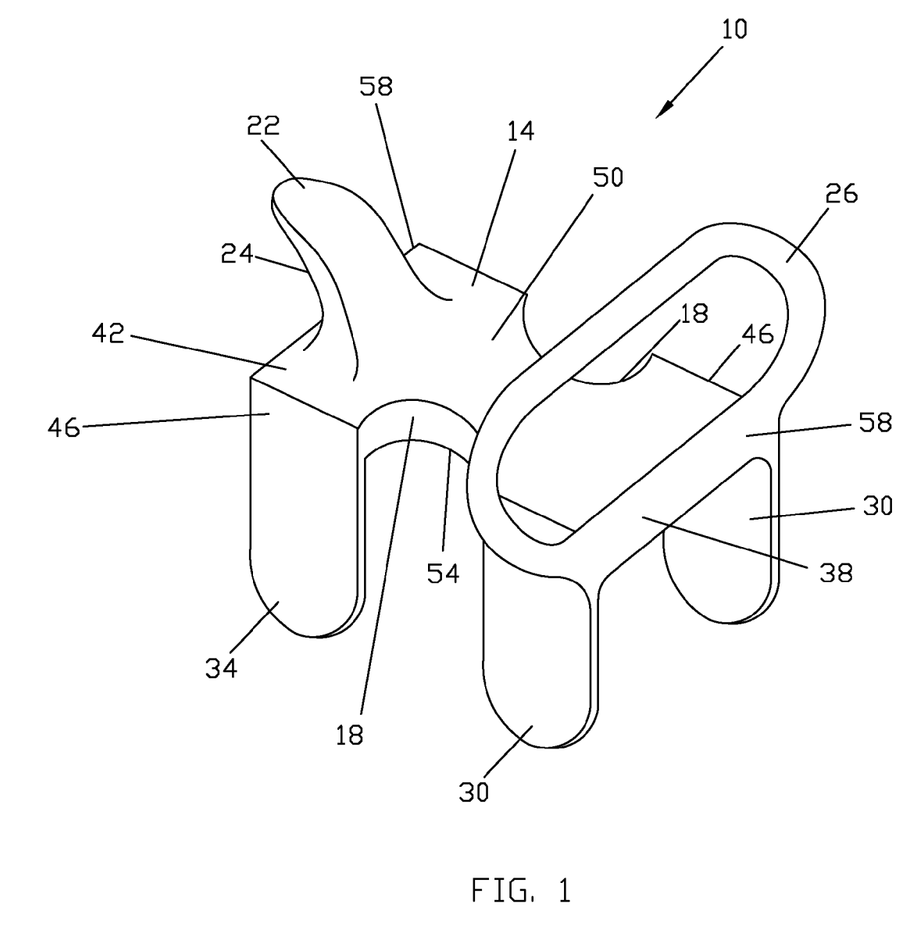
FIG. 1 is an isometric view of a rope halter apparatus configured according to a first embodiment of the present invention.
Figure 2:
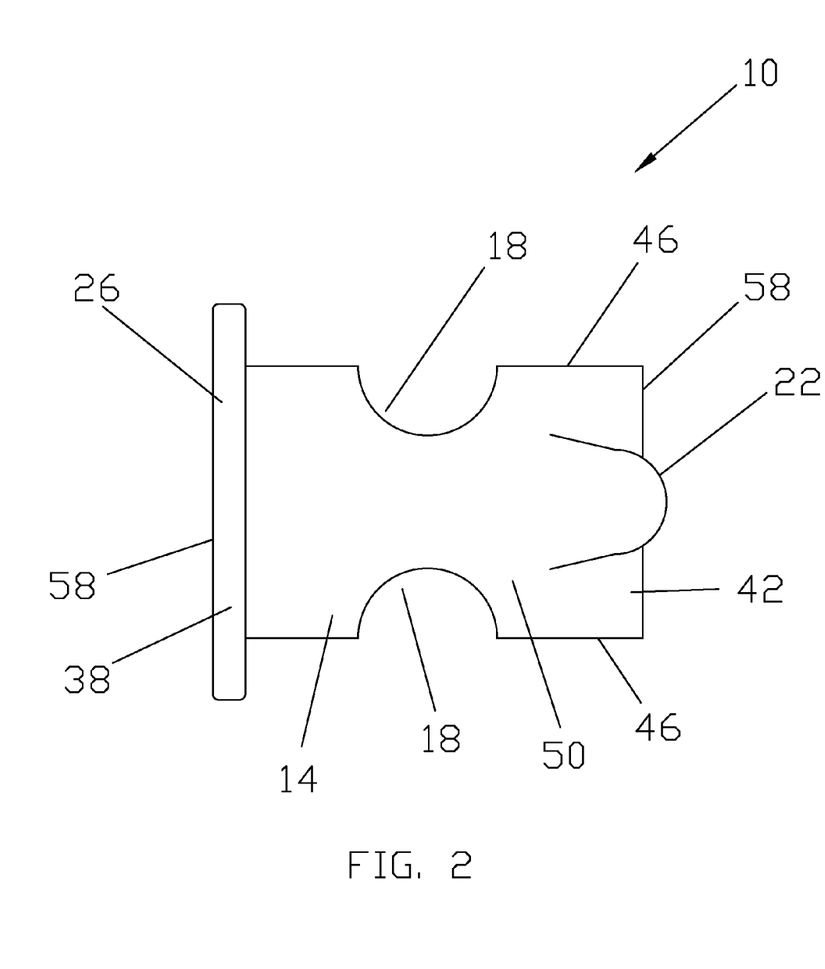
FIG. 2 is a top view of a rope halter apparatus configured according to a first embodiment of the present invention.
Figure 3:
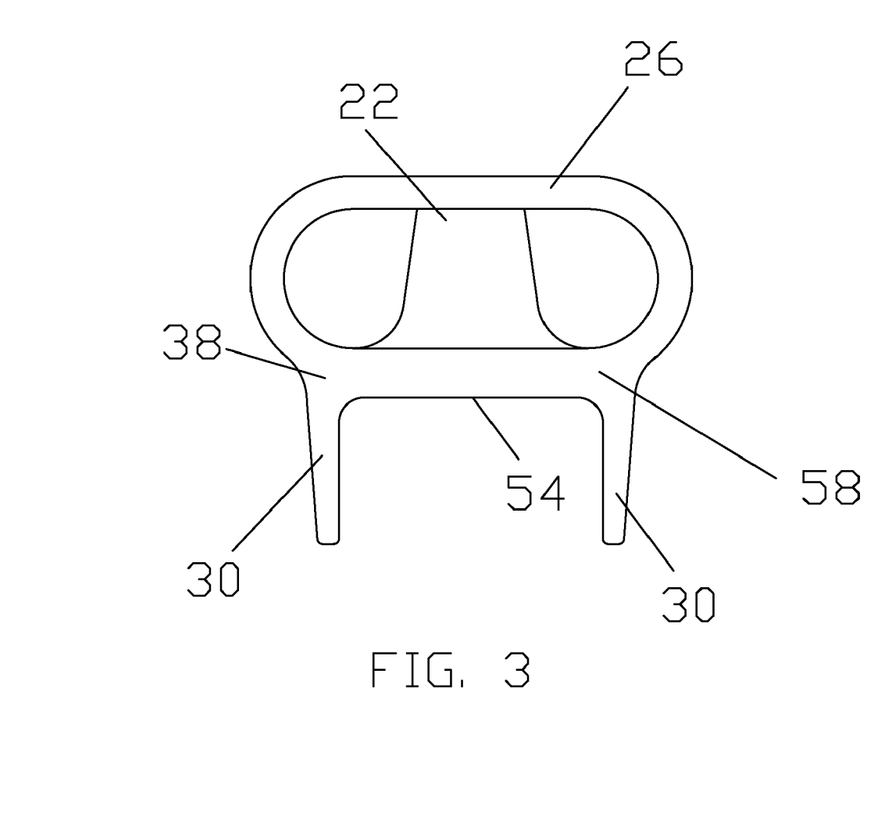
FIG. 3 is a back view of a rope halter apparatus configured according to a first embodiment of the present invention.
Figure 4:
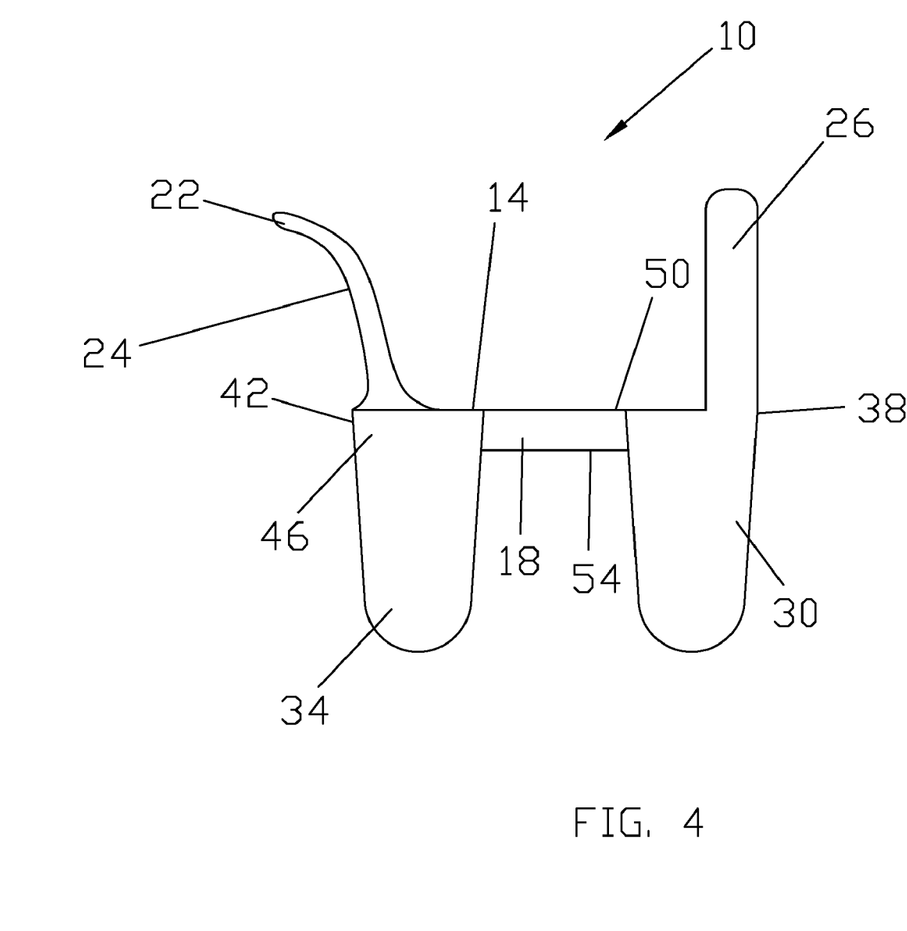
FIG. 4 is a side view of a rope halter apparatus configured according to a first embodiment of the present invention.
Figure 5:
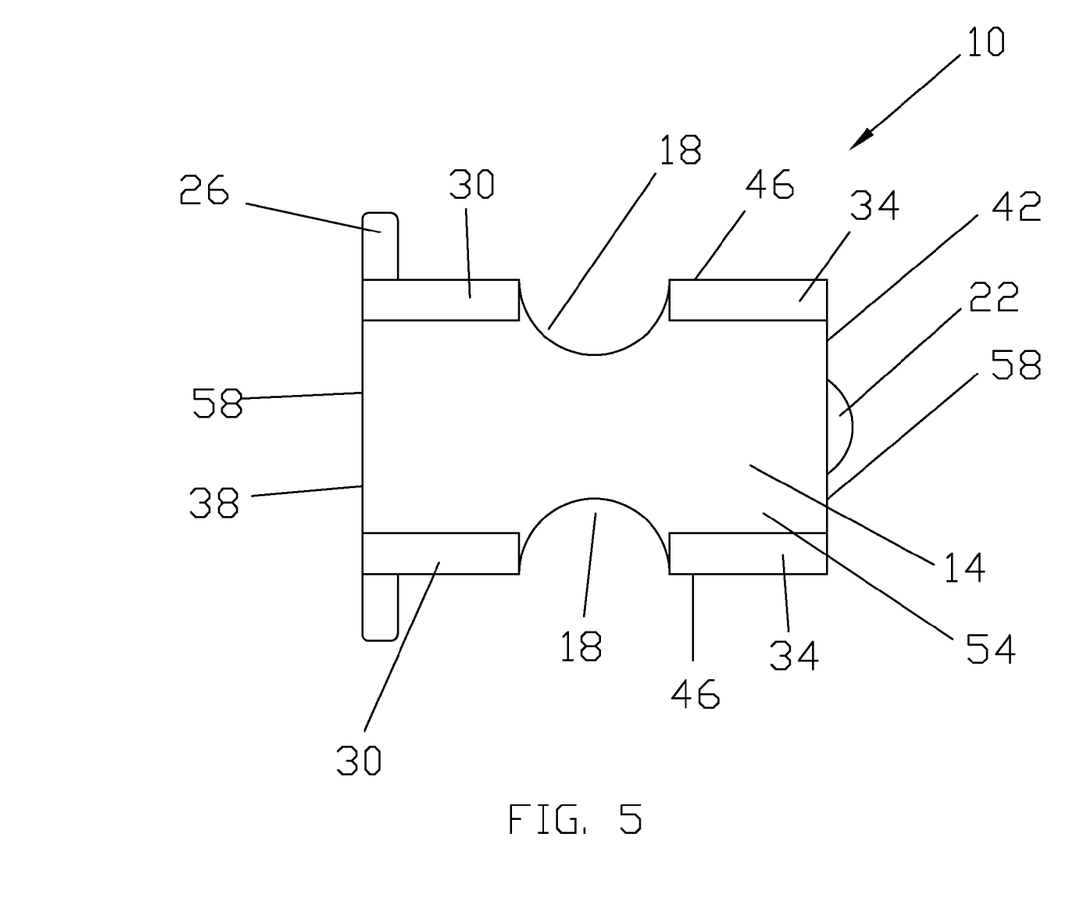
FIG. 5 is a bottom view of a rope halter apparatus configured according to a first embodiment of the present invention.
Figure 6:
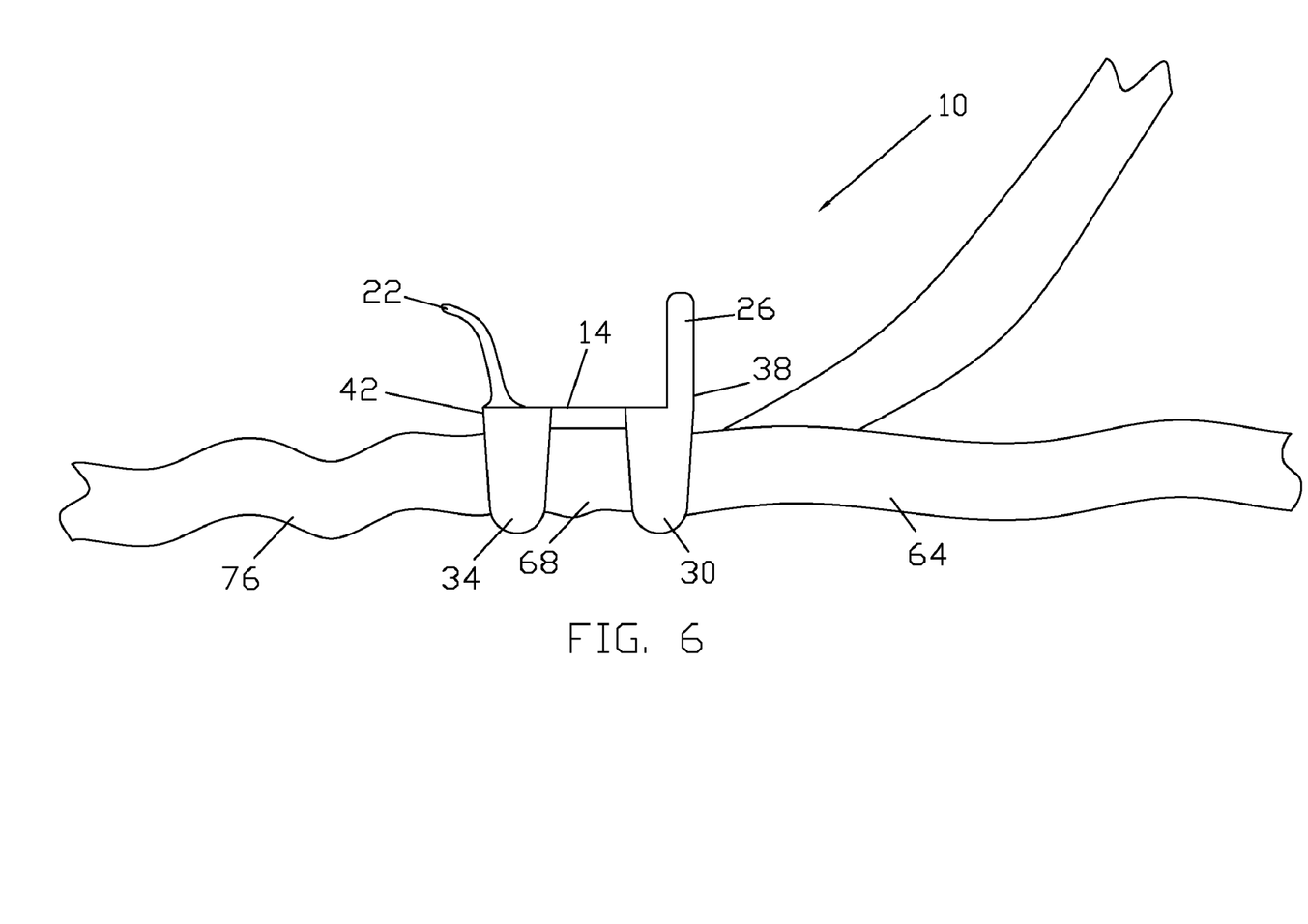
FIG. 6 is a close-up view of a rope halter apparatus configured according to a first embodiment of the present invention engaged with a rope.
Figure 7:
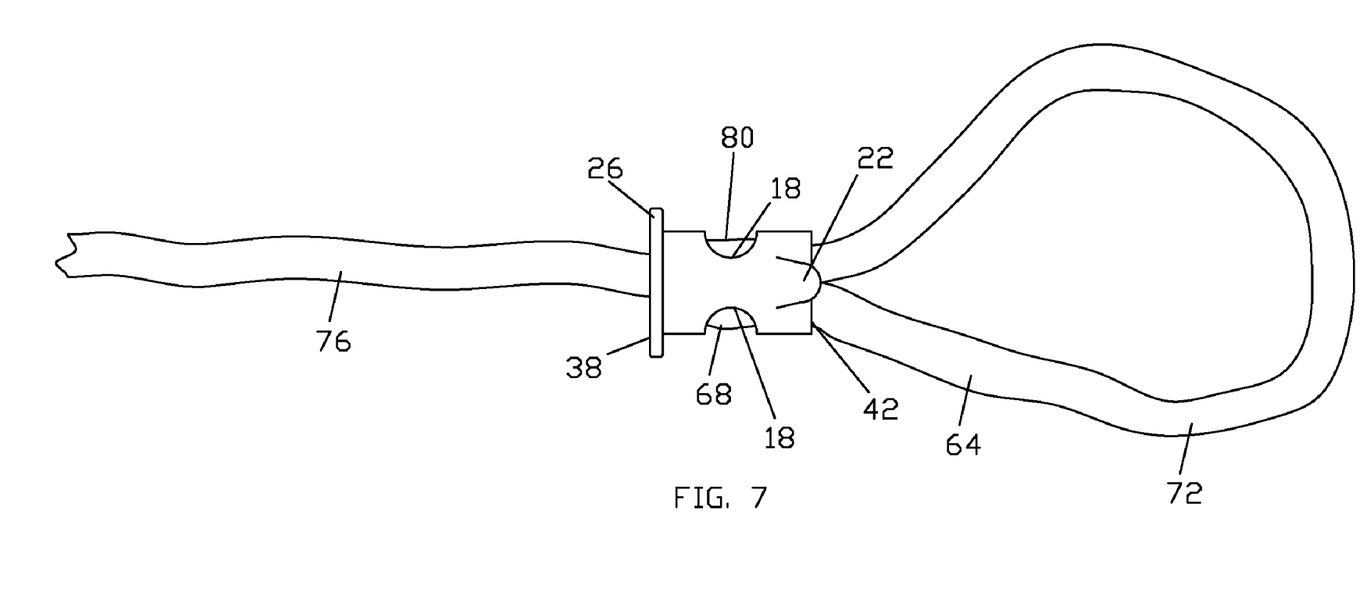
FIG. 7 is a top view of a rope halter apparatus configured according to a first embodiment of the present invention engaged with a rope.
Figures 8A, 8D:
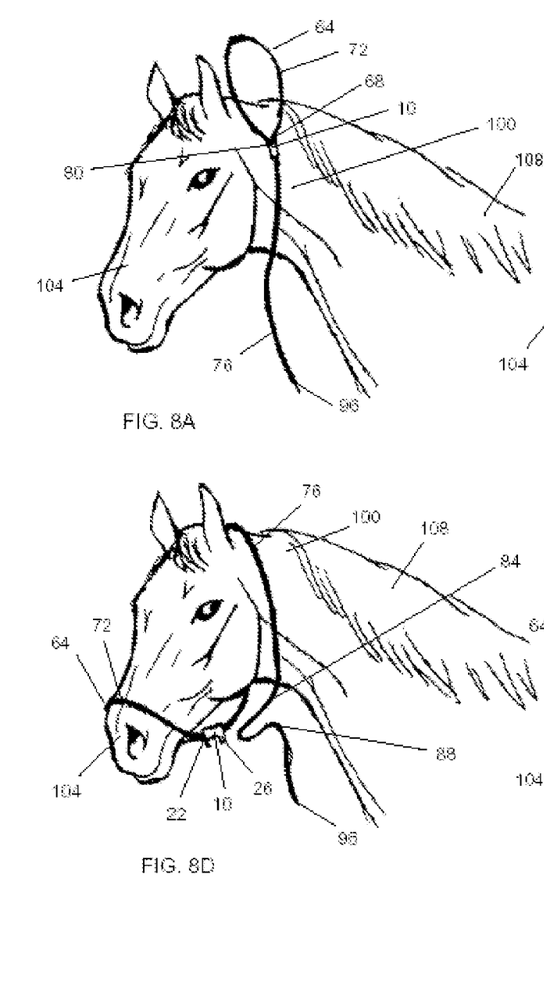
FIG. 8A illustrates a first step in a method of using a rope halter apparatus configured according to an embodiment of the present invention to form a rope halter.
FIG. 8D illustrates a fourth step in a method of using a rope halter apparatus configured according to an embodiment of the present invention to form a rope halter.

The first loop 72 is placed between the at least two front bracket legs 34 and the at least two rear bracket legs 30 so that the first loop 72 extends out the front end 42 of the rope halter apparatus 10. The front end 42 of the rope halter apparatus 10 is the end to which the hook 22 is secured. The excess length 76 of rope 64 extends out the rear end 38 of the rope halter apparatus 10. The first midpoint 68 and the first end 80 of the rope 64 are positioned in between the at least two front bracket legs 34 and in between the at least two rear bracket legs 30 or are at least positioned close to the rope halter apparatus 10, so 20 that the first end 80 of the rope 64 is not extending into areas where it could become tangled during the forming of the adjustable halter.

Figure 9:
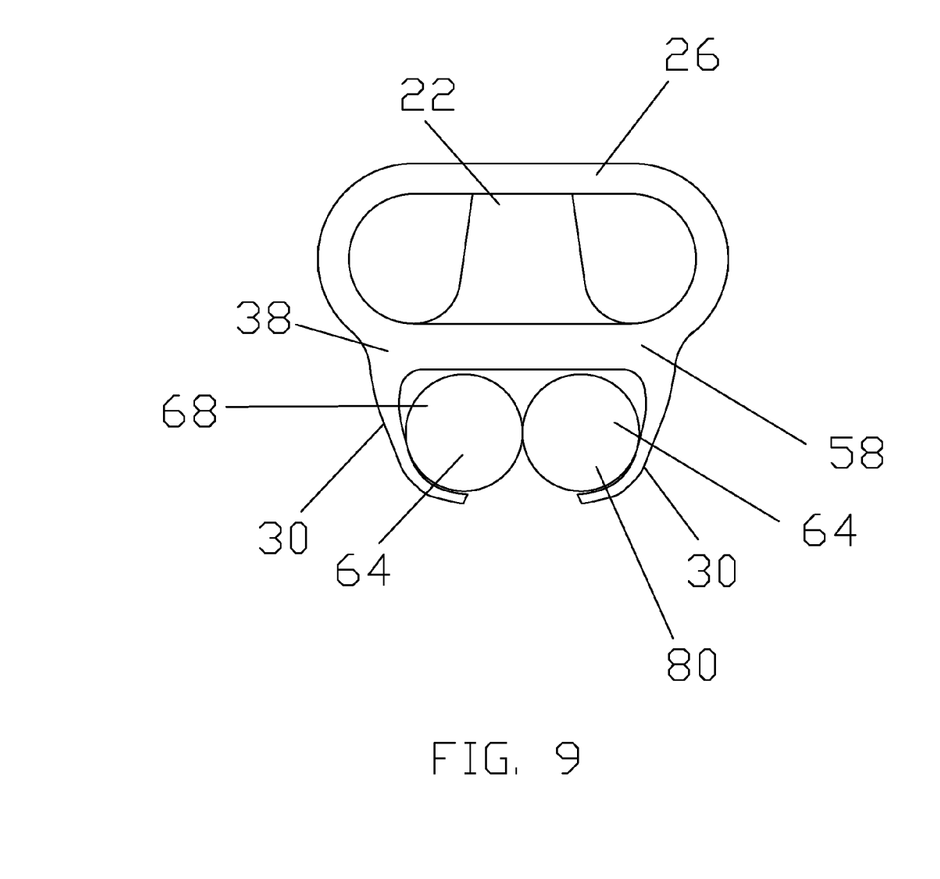
FIG. 9 is a back view of a rope halter apparatus configured according to a second embodiment of the present invention.

In alternate embodiments of the present invention as shown in FIG. 9, the at least two front bracket legs 34 and the at least two rear bracket legs 30 may be crimped over the first loop 72 once it is placed between the at least two front bracket legs 34 and the at least two rear bracket legs 30. Crimping the at least two front bracket legs 34 and the at least two rear bracket legs 30 secures the rope 64 in position.

Figures 8B, 8C, 8E, 8F:
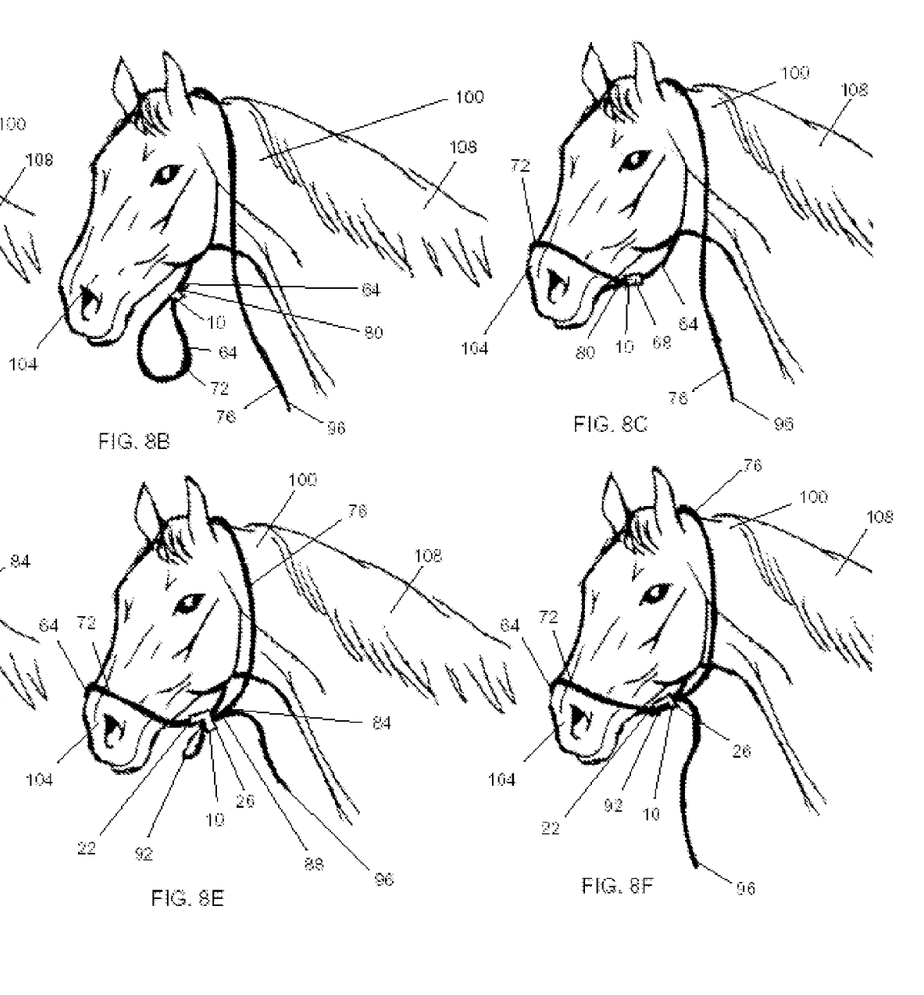
FIG. 8B illustrates a second step in a method of using a rope halter apparatus configured according to an embodiment of the present invention to form a rope halter.
FIG. 8C illustrates a third step in a method of using a rope halter apparatus configured according to an embodiment of the present invention to form a rope halter.
FIG. 8E illustrates a fifth step in a method of using a rope halter apparatus configured according to an embodiment of the present invention to form a rope halter.
FIG. 8F illustrates a sixth step in a method of using a rope halter apparatus configured according to an embodiment of the present invention to form a rope halter.

As shown in FIGS. 8A-8B, the second end 96 or excess length 76 of the rope 64 is placed over the neck 100 of an animal 108 such as a horse.

The first loop 72 in the rope 64 is placed around the animal's 108 nose 104 (FIG. 8C). The excess length 76 of rope 64 may be pulled while the first loop 72 is being placed around the animal's 108 nose 104 so that the first loop 72 is snug on the nose 104. The second end 96 or excess length 76 of the rope is still in position over the neck 100 of the animal 108.

In alternate embodiments of the present invention as shown in FIG. 9 where the at least two front bracket legs 34 and the at least two rear bracket legs 30 are crimped, the rope 64 is held securely in position, which does not allow the size of the first loop 72 to be adjusted. Therefore, a standard size first loop 72, which will fit most animals 108, is created and then the at least two front bracket legs 34 and the at least two rear bracket legs 30 are crimped into place.

FIGS. 8D-8E show a second loop 92 being formed in the rope 64. The second loop 92 is formed by placing a second midpoint 84 of the excess length 76 of rope 64 adjacent a third midpoint 88 of the excess length 76 of rope 64. The second loop 92 is then placed through the ring 26 of the rope halter apparatus 10. The second loop 92 is placed through the ring 26 so that the second midpoint 84 and the third midpoint 88 are towards the rear end 38 of the rope halter apparatus 10 and the second loop 92 itself is towards the front end 42 of the rope halter apparatus 10. The second loop 92 goes through the ring 26 and then is placed over the hook 22 of the rope halter apparatus 10.

The second end 96 of the rope 64 is then pulled in order to shrink the second loop 92 so that it fits snuggly between the hook 22 and the ring 26 of the rope halter apparatus 10 (FIG. 8F).

The method described above forms an adjustable halter with the excess length 76 of rope 64 acting as a lead rope for guiding the animal 108.

The adjustable halter may now be adjusted by moving the rope halter apparatus 10 along the excess length 76 of rope 64.

In alternate embodiments of the method, the positioning of the at least two front bracket legs 34 and the at least two rear bracket legs 30 may need to be adjusted in order to secure the first midpoint 68 and the first end 80 of rope. In additional embodiments, a different size of rope halter apparatus 10 may be required for different sizes of rope 64.

Embodiments of the present invention may be used to form a rope halter on any one of a variety of animals. For example, a halter could be tied using the present invention on dogs, cattle, or other animals.

Accordingly, for the exemplary purposes of this disclosure, the components defining any embodiment of the invention may be formed as one piece if it is possible for the components to still serve their function. The components may also be composed of any of many different types of materials or combinations thereof that can readily be formed into shaped objects provided that the components selected are consistent with the intended mechanical operation of the invention. For example, the components may be formed of rubbers (synthetic and/or natural), glasses, composites such as fiberglass, carbon-fiber and/or other like materials, polymers such as plastic, polycarbonate, PVC plastic, ABS plastic, polystyrene, polypropylene, acrylic, nylon, phenolic, any combination thereof, and/or other like materials, metals, such as zinc, magnesium, titanium, copper, iron, steel, stainless steel, any combination thereof, and/or other like materials, alloys, such as aluminum, and/or other like materials, any other suitable material, and/or any combination thereof.

The embodiments and examples set forth herein were presented in order to best explain the present invention and its practical applications and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. Accordingly, any components of the present invention indicated in the drawings or herein are given as an example of possible components and not as a limitation.

The invention claimed is:

1. A rope halter apparatus, for use in conjunction with a rope, to form an adjustable halter, comprising:
   a body having a front end, a rear end, a top surface and a bottom surface;
   a hook coupled to the top surface at the front end of the body said hook having a concave face pointed away from said rear end of body to allow a loop of rope to be secured thereto;
   a ring coupled perpendicularly to the top surface at the rear end of the body;
   at least two front bracket legs coupled to the bottom surface at the front end of the body; and
   at least two rear bracket legs coupled to the bottom surface at the rear end of the body wherein the at least two front bracket legs and the at least two rear bracket legs are positioned so as to hold at least two sections of rope together while allowing the at least two sections of rope to slide next to each other; and
   wherein the top surface and the bottom surface are rectangular with two long edges and two short edges, wherein the top surface and the bottom surface have a semicircular opening approximately midpoint on each of the two long edges, said semicircular openings create a distance between said at least two front bracket legs and said at least two rear bracket legs.

2. The rope halter of claim 1, wherein the ring is elliptical in shape.

3. The rope halter of claim 1, wherein the at least two front bracket legs and the at least two rear bracket legs are positioned to hold at least two sections of a standard size rope.

4. The rope halter of claim 1, wherein the positioning of the at least two front bracket legs and the at least two rear bracket legs is adjustable so that the at least two front bracket legs and the at least two rear bracket legs can hold different sizes of rope.

* * * * *